(12) United States Patent
Steiner

(10) Patent No.: US 10,078,126 B2
(45) Date of Patent: Sep. 18, 2018

(54) METHOD, SYSTEM AND APPARATUS FOR A LOW-POWER LOCATION MEASUREMENT RESPONDER

(71) Applicant: Intel IP Corporation, Santa Clara, CA (US)

(72) Inventor: Itai Steiner, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 208 days.

(21) Appl. No.: 14/486,148

(22) Filed: Sep. 15, 2014

(65) Prior Publication Data

US 2016/0077184 A1  Mar. 17, 2016

(51) Int. Cl.

| | | |
|---|---|---|
| *G01S 5/02* | (2010.01) | |
| *G01S 13/76* | (2006.01) | |
| *H04W 64/00* | (2009.01) | |
| *H04W 52/02* | (2009.01) | |
| *H04W 4/02* | (2018.01) | |
| *H04W 84/12* | (2009.01) | |
| *G01S 5/06* | (2006.01) | |
| *G01S 5/14* | (2006.01) | |

(52) U.S. Cl.
CPC ............... *G01S 5/021* (2013.01); *G01S 5/06* (2013.01); *G01S 13/767* (2013.01); *H04W 4/023* (2013.01); *H04W 52/0206* (2013.01); *H04W 64/00* (2013.01); *G01S 5/14* (2013.01); *H04W 84/12* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01)

(58) Field of Classification Search
CPC ..... H03L 7/095; H03L 2207/14; H03L 7/143; H04W 4/023; H04W 4/90; H04W 56/002; H04W 52/0229; H04W 52/0264; H04W 72/0453; H04W 52/0274; H04W 84/12; H04L 5/0055; G08B 3/1008; Y02D 70/20; Y02D 70/14
See application file for complete search history.

(56) References Cited

U.S. PATENT DOCUMENTS

| | | | |
|---|---|---|---|
| 9,854,468 B2 * | 12/2017 | Chu .................. | H04W 24/10 |
| 2007/0129086 A1 | 6/2007 | Toone | |
| 2008/0102859 A1 * | 5/2008 | Karr .................. | G01S 13/825 |
| | | | 455/456.3 |

(Continued)

OTHER PUBLICATIONS

U.S. Appl. No. 61/884,759 filed Sep. 30, 2013, 41 pages.

*Primary Examiner* — Joseph Dean, Jr
(74) *Attorney, Agent, or Firm* — Spectrum IP Law Group LLC

(57) ABSTRACT

In accordance with some embodiments, one or more low-power responder nodes may be utilized to provide better and lower cost coverage for fine timing measurement (FTM) requests. By advertising its availability to receive and respond to FTM requests, a low-power responder node may enter a low-power or deep sleep mode during times of unavailability. A low-power responder node may be powered by a battery, reducing the cost and deployment of nodes in a location determination network.

22 Claims, 5 Drawing Sheets

(56) References Cited

U.S. PATENT DOCUMENTS

| | | | |
|---|---|---|---|
| 2008/0247377 A1* | 10/2008 | Van Horn | H04W 52/0225 370/348 |
| 2008/0309556 A1* | 12/2008 | Hohl | G01S 5/0289 342/451 |
| 2010/0323723 A1 | 12/2010 | Gerstenberger et al. | |
| 2013/0217428 A1* | 8/2013 | Liu | H04W 52/0235 455/509 |
| 2014/0187259 A1* | 7/2014 | Kakani | H04W 64/00 455/456.1 |
| 2015/0045055 A1* | 2/2015 | Prechner | H04W 64/00 455/456.1 |
| 2015/0063228 A1* | 3/2015 | Aldana | G01S 5/0081 370/329 |
| 2015/0094103 A1* | 4/2015 | Wang | H04W 4/023 455/456.6 |
| 2016/0021495 A1* | 1/2016 | Segev | H04W 64/00 455/456.3 |

\* cited by examiner

METHOD, SYSTEM AND APPARATUS FOR A LOW-POWER LOCATION MEASUREMENT RESPONDER

TECHNICAL FIELD

The present disclosure relates generally to the field of wireless communications technologies. More particularly, the present disclosure relates to techniques for location determination using low-power location measurement responders.

BACKGROUND

Mobile devices have long had the ability to track their own location relative to the surface of the Earth through receipt and analysis of wireless signals from multiple global positioning system (GPS) or global navigation satellite system (GNSS) satellites. Thus, users of such computing devices, whether carried on their persons or installed within vehicles, have long been able to view a visual presentation of where they are on the surface of the Earth at any given moment. Further, beyond simply presenting location information such as a current set of coordinates, mobile devices have long incorporated location applications or clients (hereinafter clients) to make use of such location information in providing other services (for example, presenting weather predictions for a current location; presenting locations of shops or gas stations, along with their prices, etc., near a current position; presenting nearby realtor listings; and the like).

More recently, mobile devices provide the ability to track their own location relative to an interior of a venue (e.g., an interior of a mall, a store, an airport terminal, etc.) with a finer location accuracy level than possible using signals emanating from satellites, which may also not be able to penetrate portions of such structures to reach their interiors. Indoor location determination is typically performed by receiving and analyzing wireless signals emanating from wireless network access points (APs) forming a location network within such a venue.

Typically, wireless signals from at least three APs are needed to perform location determination. AP devices can be expensive to operate and require a power source. Providing enough APs to support location determination can be cost prohibitive for venues.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
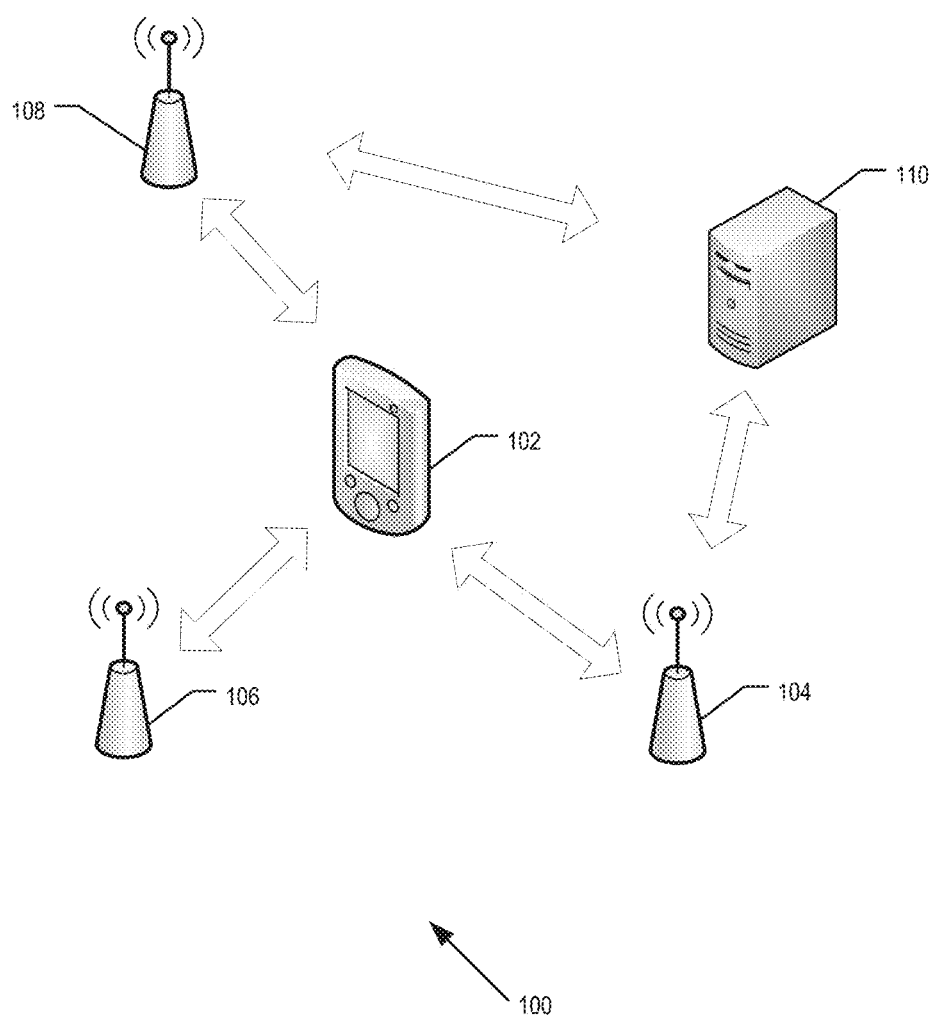
FIG. 1 illustrates a location determination network in accordance with some embodiments.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", and the like, indicate that the embodiment(s) of the invention so described may include particular features, structures, or characteristics, but not every embodiment necessarily includes the particular features, structures, or characteristics. Further, some embodiments may have some, all, or none of the features described for other embodiments.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on one or more computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Conversion from one form of code to another does not need to take place in real time, or by the processor that executes the code. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

The term "wireless" may be used to describe circuits, devices, systems, methods, techniques, communications channels, etc., that communicate data by using modulated electromagnetic radiation through a non-solid medium. The term "wireless device", as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and/or the data that has been received. The processor(s) may also process other data which is neither transmitted nor received.

As used within this document, the term "mobile device" is intended to cover those devices whose wireless communications are at least partially scheduled and/or controlled by a network controller. A mobile device (MD) may also be known as a mobile station (MS), STA, subscriber station (SS), user equipment (UE), or any other term that may arise to describe the functionality of a mobile device. Mobile devices may move during such wireless communications, but movement is not required. The term "station" (STA), as used herein, may include any logical entity that is a singly addressable instance of a medium access control (MAC) and a physical layer (PHY) interface to a wireless medium (WM).

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with standard wireless communications technologies such as devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, existing WirelessHD™ specifications, and/or future versions and/or derivatives thereof, existing and/or Wireless Fidelity (WiFi) Alliance (WFA) Peer-to-Peer (P2P) specifications (WiFi P2P technical specification, version 1.3, 2012), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

FIG. 1 illustrates a location determination network 100 in accordance with some embodiments. Location determination network 100 includes a wireless communication device 102 and multiple fixed wireless location devices 104, 106, and/or 108. In some embodiments location determination network 100 is a wireless communications network, wherein wireless communication device 102 and one or more of fixed location devices 104, 106, and/or 108 are capable of communicating content, data, information and/or signals over a wireless communication medium, for example, a radio channel, an IR channel, a Radio Frequency (RF) channel, a Wireless Fidelity (WiFi) channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and/or the like.

In some embodiments, wireless communication device 102 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a smart phone, a cellular telephone, a PCS device, a PDA device which incorporates a wireless communication device, or the like. Wireless communication device 102 may incorporate multiple location determination methods (e.g., GPS, GNSS, motion sensing, triangulation from signal sources, received signal strength indicator (RSSI) or 802.11 or WiFi Time-Of-Flight (TOF) fine timing measurement (FTM) data measurements and/or the like.

Fixed locations devices 104, 106, and/or 108 may be wireless Access Points (APs) or any other such fixed location device that can communicate wirelessly with wireless communication device 102 such that wireless communication device 102 can obtain raw data measurements of the communications for use in location determination. Typical raw data measurements used in location determination methods include, but are not limited to, TOF-FTM or RSSI data measurements of communications received from and/or sent to fixed wireless location devices 104-108 by wireless communication device 102. Location determination network 100 may include more or less fixed location devices, but typically, data measurements from at least three of fixed location devices 104-108 are needed for accurate location determination of wireless communication device 102.

In accordance with some embodiments, location determination calculations utilize fine timing measurements made by the wireless communication device 102 and by at least three fixed location devices 104-108. As such, a wireless communication device 102 captures raw data measurements from wireless communications from each of fixed location devices 104-108 and each of fixed location devices 104-108 capture raw data measurements from wireless communications from wireless communication device 102.

Fixed location device 104 may be a low-power responder node that responds to FTM requests from wireless communication device 102. Low-power responder node 104 may enter a deep sleep or low-power mode conserving energy and only wake to respond to requests for fine timing measurements. As such, low-power responder node 104 may publish information regarding windows of time when it is available to receive and respond to FTM requests.

In accordance with some embodiments, low-power responder node 104 may publish this information directly or indirectly, for example, via a network management or gateway node 110. In such an example, both low-power responder node 104 and a FTM requesting node such as wireless communication device 102 communicate with network management node 110. Network management node 110 may provide to any potential FTM requesting nodes information on the availability of low-power responder node 104. The exchange of information may occur during times when low-power responder node 104 is in a low-power mode or during other times of availability or unavailability.

In accordance with some embodiments, low-power responder node 104 may communicate its availability using, for example, an IEEE 802.11K/U Location Configuration Information (LCI), a Neighbor-Report or other such query/ response between low-power responder node 104, another AP device 106 and/or 108, wireless communication device 102 and or the network management node 110.

Figure 2A:
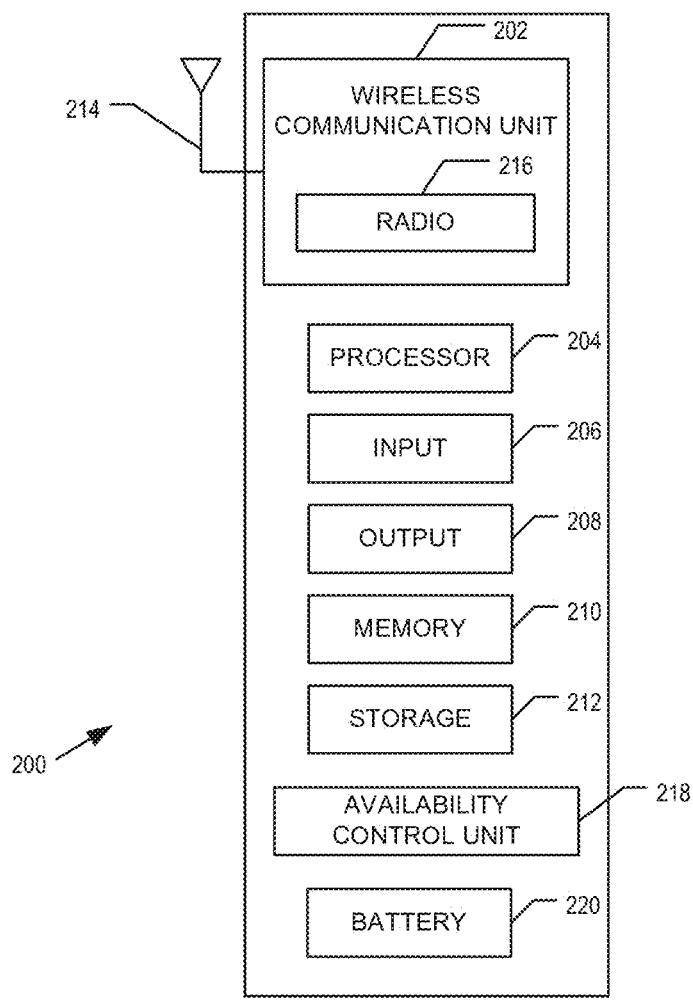
FIG. 2A illustrates a low-power responder node in accordance with some embodiments.

FIG. 2A illustrates a low-power responder node 200 in accordance with some embodiments. In some embodiments, low-power responder node 200 includes a wireless communication unit 202 to perform wireless communication between other wireless communication devices. Low-power responder node 200 may also include, for example, one or more of a processor 204, an input unit 206, an output unit 208, a memory unit 210, a storage unit 212, availability control unit 218 and/or battery 220. Low-power responder node 200 may optionally include other suitable hardware components and/or software components.

In some embodiments, some or all of the components of one or more of low-power responder node 200 may be enclosed in a common housing or packaging, and may be interconnected or operably associated using one or more wired or wireless links. In other embodiments, components of one or more of low-power responder node 200 may be distributed among multiple or separate devices.

Processor 204 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 204 may execute instructions, for example, of an Operating System (OS) of low-power responder node 200 and/or of one or more suitable clients.

Input unit 206 may include, for example, a keyboard, a keypad, a mouse, a touch-screen, a touch-pad, a track-ball, a stylus, a microphone or, other suitable pointing device or input device. Output unit 208 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 210 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 212 may include, for example, a hard disk drive, a floppy disk drive, a Compact Disk (CD) drive, a CD-ROM drive, a DVD drive, or other suitable removable or non-removable storage units. Memory unit 210 and/or storage unit 212, for example, may store data processed by low-power responder node 200.

In some embodiments, wireless communication unit 202 may include, or may be associated with, one or more antennas 214. Antennas 214 may include any type of antennas suitable for transmitting and/or receiving wireless communication signals, blocks, frames, transmission streams, packets, messages and/or data. For example, antennas 214 may include any suitable configuration, structure and/or arrangement of one or more antenna elements, components, units, assemblies and/or arrays. Antennas 214 may include, for example, antennas suitable for directional communication. For example, antennas 214 may include a phased array antenna, a single element antenna, a set of switched beam antennas, and/or the like. In some embodiments, antennas 214 may implement transmit and receive functionalities using separate transmit and receive antenna elements. In some embodiments, antennas 214 may implement transmit and receive functionalities using common and/or integrated transmit/receive elements.

In some embodiments, wireless communication unit 202 may include, for example, one or more radios 216, for example, including one or more wireless transmitters, receivers and/or transceivers able to send and/or receive wireless communication signals, RF signals, frames, blocks, transmission streams, packets, messages, data items, and/or data. For example, wireless communication unit 202 may include or may be implemented as part of a wireless Network Interface Card (NIC), and the like. Radio 216 may perform raw data measurements of wireless communications from a FTM requesting device.

Availability control unit 218 may publish availability information identifying when low-power responder node 200 is available to receive FTM requests. Availability control unit 218 may also control when low-power responder node 200 enters and exits low-power modes such as a deep sleep mode where it is unable to receive any incoming traffic. Low-power responder node 200 may be powered by a battery 220.

In accordance with some embodiments, low-power responder node 200 may be utilized to provide better and lower cost coverage for FTM requests. Thus, low-power responder node 200 may maintain long idle times during inactive periods (when the FTM service is not required by any client/initiators), preserve power and allow potentially long-run on battery power.

Figure 2B:
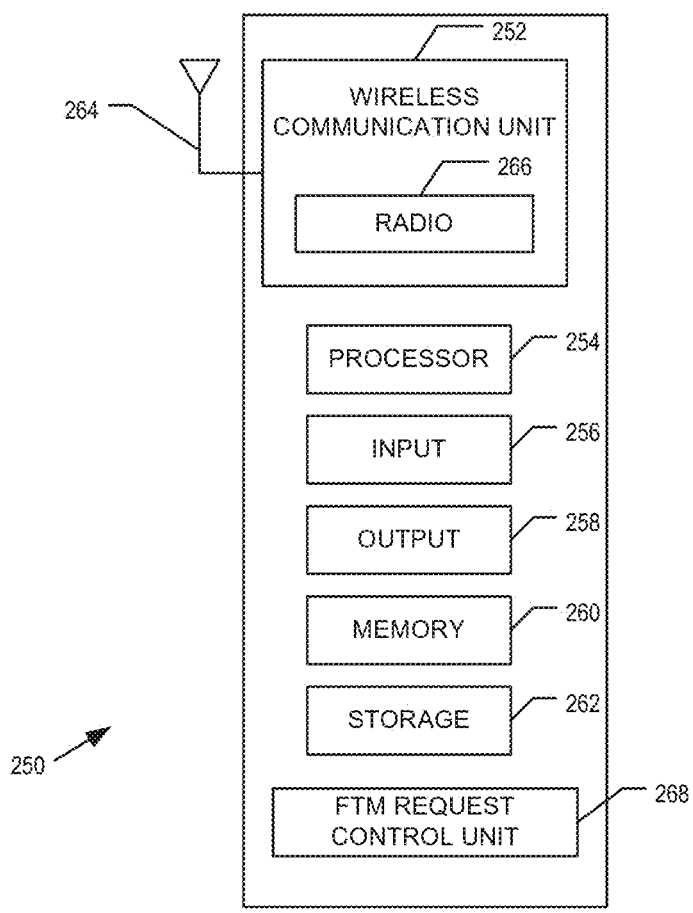
FIG. 2B illustrates a fine timing measurement (FTM) requester node in accordance with some embodiments.

FIG. 2B illustrates a fine timing measurement (FTM) requester node in accordance with some embodiments. In some embodiments, FTM requester node 250 includes similar components and configuration as low-power responder node 200, including a wireless communication unit 252, one or more of a processor 254, an input unit 256, an output unit 258, a memory unit 260, a storage unit 262, antenna(s) 264 and radio 266. FTM requester node 250 may optionally include other suitable hardware components and/or software components.

FTM requester node 250 may include an FTM request control unit 268 that receives availability information of a low-power responder node and only sends FTM requests to the low-power responder node during advertised availability times.

Figure 3:
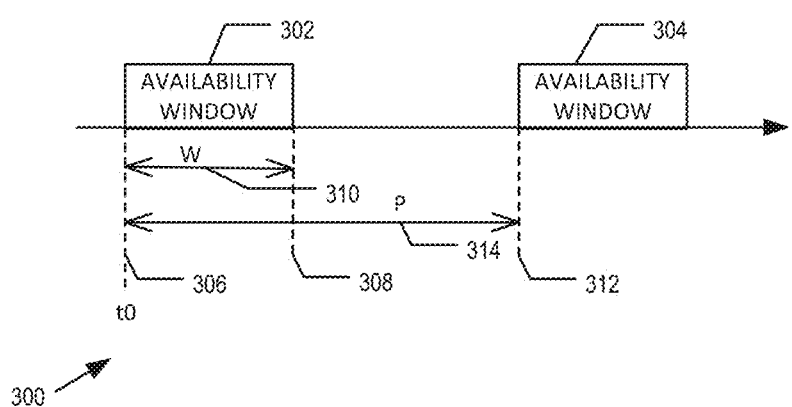
FIG. 3 illustrates elements of responder availability windows in accordance with some embodiments.

FIG. 3 illustrates elements of responder availability window information 300 in accordance with some embodiments. As illustrated, a low-power responder node has multiple availability windows, 302 and 304. At time 306 (t0), a fine timing measurement request (FTMR) window begins, indicating when the low-power responder node is able to receive a FTM Request Frame and start the FTM procedure. Such time may be based on a WiFi Time-Sync-Function (TSF), GPS time or other such timing format. Availability window 302 begins at time 306 (t0) and ends at time 308 indicating the parameter FTMR Availability Window 310 (w), that is, how long the low-power responding node is available to accept and respond to FTM Request Frames. The beginning of availability window 302, time 306 (t0), to the beginning of availability window 304, time 312, illustrates the parameter FTMR Availability Windows periodicity 314 (p), indicating the periodicity of the subsequent availability windows. Parameters such as t0, w, and p may be published by the low-power responder node to indicate availability information. These parameters may allow for the potential time-drift based on the timing technology used (TSF, GPS, and the like) and the frequency of the time-sync procedure performed by the requesting node and the low-power responding node.

According to some embodiments, availability window information may be communicated in accordance with IEEE 802.11K/U Location Configuration Information (LCI) procedures. Availability window information, such as FTMR Availability Time (t0), FTMR Availability Window (w), and FTMR Availability Windows periodicity (p), may be added to a LCI Report that currently includes Latitude, Longitude, Altitude, and optional Azimuth information.

According to some embodiments, availability window information may be communicated in accordance with IEEE 802.11K Neighbor Report procedures. Availability window information, such as FTMR Availability Time (t0), FTMR Availability Window (w), and FTMR Availability Windows periodicity (p), may be added to a neighbor report request that is sent to an AP, which returns information about known neighbor APs that are candidates for a service set transition. Neighbor reports may contain information from the table dot11RRMNeighborReportTable in the MIB concerning neighbor APs. This request/report pair enables a STA to gain information about the neighbors of the associated AP to be used as potential FTM procedure candidates.

According to some embodiments, availability window information may be communicated in accordance with Beacon Response and AP Beacon procedures. For example, elements such as FTMR Availability Time (t0), FTMR Availability Window (w), and FTMR Availability Windows periodicity (p) may be added to the beacon communications.

Figure 4:
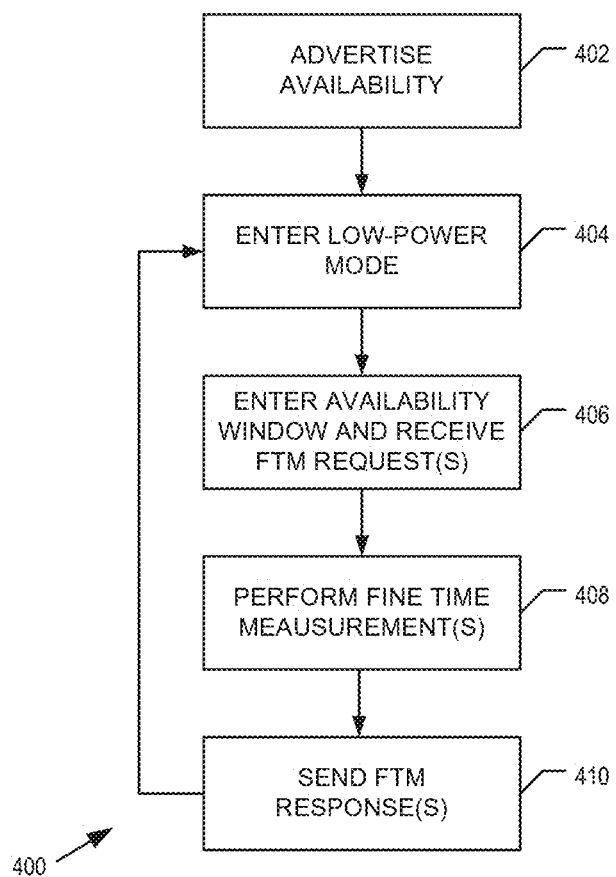
FIG. 4 illustrates a flow diagram of a low-power responder node in accordance with some embodiments.

FIG. 4 illustrates a flow diagram of a low-power responder node in accordance with some embodiments. Low-power responder node advertises its availability to receive and respond to requests for fine timing measurements, block 402. Low-power responder node enters low-power mode such as a deep sleep or other such mode, conserving power, block 404. Low-power responder node enters an availability window and potentially receives FTM request(s), block 406. If a request is received, low-power node performs fine timing measurements, block 408 and sends those measurements to the requesting node, block 410.

In accordance with some embodiments, one or more low-power responder nodes may be utilized to provide better and lower cost coverage for FTM requests. By advertising its availability to receive and respond to FTM requests, a low-power responder node may enter a low-power or deep sleep mode during times of unavailability. A low-power responder node may be powered by a battery, reducing the cost and deployment of nodes in a location determination network.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

EXAMPLES

The following examples pertain to further embodiments.

Example 1 includes a wireless communication apparatus, the apparatus including a wireless communication unit to receive and respond to a request for a fine timing measurement (FTM); and an availability control unit to advertise availability information indicating times when the wireless communication unit is able to receive the request for the fine time measurement and to cause the wireless communication unit to enter and exit low-power modes.

Example 2 includes the subject matter of Example 1, the wireless communication unit including a radio unit to capture data measurements of a wireless communication from an FTM requesting device.

Example 3 includes the subject matter of any one of Examples 1-2, wherein the data measurements are FTM time of flight (TOF) measurements.

Example 4 includes the subject matter of any one of Examples 1-3, wherein the wireless communication is a WiFi communication.

Example 5 includes the subject matter of any one of Examples 1-4, wherein the wireless communication unit is unable to receive and send wireless communications during the low-power modes.

Example 6 includes the subject matter of any one of Examples 1-5, wherein the availability information includes an FTM request availability time, an FTM request availability window, and an FTM request availability window periodicity.

Example 7 includes the subject matter of any one of Examples 1-6, wherein the availability information is advertised via IEEE 802.11K/U location configuration information (LCI) procedures.

Example 8 includes the subject matter of any one of Examples 1-7, wherein the availability information is advertised via IEEE 802.11K neighbor report procedures.

Example 9 includes the subject matter of any one of Examples 1-8, wherein the availability information is advertised via beacon communication procedures.

Example 10 includes the subject matter of any one of Examples 1-9, wherein the availability information is advertised via a network management node.

Example 11 includes a method of wireless communication of a wireless communication device, the method including advertising availability information indicating times when the wireless communication device is able to receive a request for a fine timing measurement (FTM); receiving and responding to the request for the FTM during an advertised availability time; and exiting a low-power mode at the beginning of the advertised availability time and entering another low-power mode at the end of the advertised availability time.

Example 12 includes the subject matter of Example 11, further including capturing data measurements of a wireless communication from a device requesting the FTM.

Example 13 includes the subject matter of any one of Examples 11-12, wherein the data measurements are FTM time of flight (TOF) measurements.

Example 14 includes the subject matter of any one of Examples 11-13, wherein the wireless communication is a WiFi communication.

Example 15 includes the subject matter of any one of Examples 11-14, wherein the wireless communication device is unable to receive and send wireless communications during the low-power mode.

Example 16 includes the subject matter of any one of Examples 11-15, wherein the availability information includes an FTM request availability time, an FTM request availability window, and an FTM request availability window periodicity.

Example 17 includes the subject matter of any one of Examples 11-16, wherein the availability information is advertised via IEEE 802.11K/U location configuration information (LCI) procedures.

Example 18 includes the subject matter of any one of Examples 11-17, wherein the availability information is advertised via IEEE 802.11K neighbor report procedures.

Example 19 includes the subject matter of any one of Examples 11-18, wherein the availability information is advertised via beacon communication procedures.

Example 20 includes the subject matter of any one of Examples 11-19, wherein the availability information is advertised devices via a network management node.

Example 21 includes a computer-readable non-transitory storage medium that contains instructions, which when executed by one or more processors result in performing the operations of any one of Examples 11-20.

Example 22 includes a wireless communications device having a processor, a memory, and a radio, the device adapted to perform the operations of any one of Examples 11-20.

Example 23 includes a wireless communications device having means for performing the operations of any one of Examples 11-20.

Example 24 includes a method of wireless communication, the method including receiving availability information of a low-power responder node; requesting a fine timing measurement (FTM) from the low-power responder node during an advertised availability time indicated by the availability information; and receiving data measurements from the low-power responder node during the advertised availability time.

Example 25 includes the subject matter of Example 24, further including capturing other data measurements of a wireless communication from the low-power responder node.

Example 26 includes the subject matter of any one of Examples 24-25, wherein the wireless communication is a WiFi communication.

Example 27 includes the subject matter of any one of Examples 24-26, wherein the data measurements are FTM time of flight (TOF) measurements.

Example 28 includes the subject matter of any one of Examples 24-27, wherein the low-power responder node is only able to receive and send wireless communications during the advertised availability time.

Example 29 includes the subject matter of any one of Examples 24-28, wherein the availability information includes an FTM request availability time, an FTM request availability window, and an FTM request availability window periodicity.

Example 30 includes the subject matter of any one of Examples 24-29, wherein the availability information is advertised via IEEE 802.11K/U location configuration information (LCI) procedures.

Example 31 includes the subject matter of any one of Examples 24-30, wherein the availability information is advertised via IEEE 802.11K neighbor report procedures.

Example 32 includes the subject matter of any one of Examples 24-31, wherein the availability information is advertised via beacon communication procedures.

Example 33 includes the subject matter of any one of Examples 24-32, wherein the availability information is advertised via a network management node.

Example 34 includes a computer-readable non-transitory storage medium that contains instructions, which when executed by one or more processors result in performing the operations of any one of Examples 24-33.

Example 35 includes a wireless communications device having a processor, a memory, and a radio, the device adapted to perform the operations of any one of Examples 24-33.

Example 36 includes a wireless communications device having means for performing the operations of any one of Examples 24-33.

Example 37 includes a wireless communication apparatus, the apparatus including a fine timing measurement (FTM) request control unit to receive availability information of a low-power responder node, the availability information indicating an advertised availability time when the low-power responder node is able to receive and respond to requests for a FTM; and a wireless communication unit to send requests for FTM to and receive responses from the low-to power responder node during the advertised availability times.

Example 38 includes the subject matter of Example 37, the wireless communication unit including a radio unit to capture data measurements of a wireless communication from the low-power responder node.

Example 39 includes the subject matter of Example 38, wherein the wireless communication is a WiFi communication.

Example 40 includes the subject matter of any one of Examples 37-39, wherein the data measurements are FTM time of flight (TOF) measurements.

Example 41 includes the subject matter of any one of Examples 37-40, wherein the low-power responder node is only able to receive and respond to FTM requests during the advertised availability time.

Example 42 includes the subject matter of any one of Examples 37-41, wherein the availability information includes an FTM request availability time, an FTM request availability window, and an FTM request availability window periodicity.

Example 42 includes the subject matter of any one of Examples 37-41, wherein the availability information is advertised via IEEE 802.11K/U location configuration information (LCI) procedures.

Example 43 includes the subject matter of any one of Examples 37-42, wherein the availability information is advertised via IEEE 802.11K neighbor report procedures.

Example 44 includes the subject matter of any one of Examples 37-43, wherein the availability information is advertised via beacon communication procedures.

Example 45 includes the subject matter of any one of Examples 37-44, wherein the availability information is advertised via a network management node.

The foregoing description is intended to be illustrative and not limiting. Variations will occur to those of skill in the art. Those variations are intended to be included in the various embodiments of the invention, which are limited only by the scope of the following claims.

What is claimed is:

1. A wireless communication apparatus comprising:
   a wireless communication unit to receive and respond to a request for a fine timing measurement (FTM); and
   an availability control unit to advertise availability information indicating one or more availability windows when the wireless communication unit is able to receive the request for the FTM, the availability control unit to cause the wireless communication unit to enter and exit low-power modes;
   wherein the wireless communication unit is unable to receive and send wireless communications during the low-power modes;
   wherein each time availability window further comprises a start time and an end time.

2. The wireless communication apparatus of claim 1, the wireless communication unit comprising a radio unit to capture data measurements of a wireless communication from an FTM requesting device.

3. The wireless communication apparatus of claim 2, wherein the data measurements are FTM time of flight (TOF) measurements.

4. The wireless communication apparatus of claim 2, wherein the wireless communication is a WiFi communication.

5. The wireless communication apparatus of claim 1, wherein the availability information comprises an FTM request availability time, an FTM request availability window, and an FTM request availability window periodicity.

6. The wireless communication apparatus of claim 1, wherein the availability information is advertised via WLAN associated technology standards.

7. The wireless communication apparatus of claim 1, wherein the availability information is advertised via beacon communication procedures.

8. The wireless communication apparatus of claim 1, wherein the availability information is advertised via a network management node.

9. A method of wireless communication of a wireless communication device comprising:

advertising availability information to communicate an availability window, the availability window indicating a start time and an end time when the wireless communication device is able to receive a request for a fine timing measurement (FTM);

receiving and responding to the request for the FTM during an advertised availability time; and exiting a low-power mode at the beginning of the advertised availability time and entering another low-power mode at the end of the advertised availability time;

wherein the wireless communication unit is unable to receive and send wireless communications during the low-power modes.

10. The method of wireless communication of claim 9, further comprising capturing data measurements of a wireless communication from a device requesting the FTM.

11. The method of wireless communication of claim 10, wherein the data measurements are FTM time of flight (TOF) measurements.

12. The method of wireless communication of claim 9, wherein the availability information comprises an FTM request availability time, an FTM request availability window, and an FTM request availability window periodicity.

13. A method of wireless communication comprising:

receiving availability information from a low-power responder node, the availability information further an availability window with a start time and an end time indicating when the low-power responder node is available for fine timing measurement (FTM);

requesting an FTM from the low-power responder node during an advertised availability time indicated by the availability information of the low-power responder node; and receiving data measurements from the low-power responder node during the advertised availability time, wherein the low-power responder node is unable to receive and send wireless communications other than during the advertised availability time.

14. The method of wireless communication of claim 13, wherein the data measurements are FTM time of flight (TOF) measurements.

15. The method of wireless communication of claim 13, wherein the availability information is advertised via beacon communication procedures.

16. A wireless communication apparatus comprising:

a fine timing measurement (FTM) request control unit to receive availability information of a low-power responder node, the availability information indicating an advertised availability time when the low-power responder node is able to receive and respond to requests for a FTM, wherein the low-power responder node is unable to receive and send wireless communications other than during the advertised availability time; and a wireless communication unit to send requests for FTM to and receive responses from the low-power responder node during the advertised availability times;

wherein the availability information comprises an FTM request availability time, an FTM request availability window, and an FTM request availability window periodicity.

17. The wireless communication apparatus of claim 16, the wireless communication unit comprising a radio unit to capture data measurements of a wireless communication from the low-power responder node.

18. The wireless communication apparatus of claim 17, wherein the data measurements are FTM time of flight (TOF) measurements.

19. The wireless communication apparatus of claim 16, wherein the availability information comprises an FTM request availability time, an FTM request availability window, and an FTM request availability window periodicity.

20. The wireless communication apparatus of claim 16, wherein the availability information is advertised via WLAN associated technology standards.

21. The wireless communication apparatus of claim 16, wherein the availability information is advertised via beacon communication procedures.

22. The wireless communication apparatus of claim 16, wherein the availability information is advertised via a network management node.

* * * * *